US008232342B2

(12) United States Patent
Jin et al.

(10) Patent No.: US 8,232,342 B2

(45) **Date of Patent: *Jul. 31, 2012**

(54) TRANSPARENT ABS RESIN COMPOSITION HAVING EXCELLENT IMPACT STRENGTH AND FLOWABILITY

(75) Inventors: Young Sub Jin, Seoul (KR); Jae Keun Hong, Gunpo-si (KR); Hwan Seok Park, Anyang-si (KR); Byeong Do Lee, Gwangjugwangyeok-si (KR)

(73) Assignee: Cheil Industries Inc., Gumi-si (KR)

(*) Notice: Subject to any disclaimer, the term of this patent is extended or adjusted under 35 U.S.C. 154(b) by 272 days.

This patent is subject to a terminal disclaimer.

(21) Appl. No.: 12/370,720

(22) Filed: Feb. 13, 2009

(65) Prior Publication Data

US 2009/0156719 A1 Jun. 18, 2009

Related U.S. Application Data

(63) Continuation-in-part of application No. PCT/KR2006/005736, filed on Dec. 27, 2006.

(30) Foreign Application Priority Data

Sep. 12, 2006 (KR) ........................ 10-2006-0087885
Dec. 27, 2006 (KR) ........................ 10-2006-0134428

(51) Int. Cl.

| | |
|---|---|
| ***C08F 290/04*** | (2006.01) |
| ***C08L 51/00*** | (2006.01) |
| ***C07F 7/12*** | (2006.01) |
| ***B01J 19/06*** | (2006.01) |
| ***B60C 1/00*** | (2006.01) |
| ***B32B 27/28*** | (2006.01) |
| ***C08G 63/48*** | (2006.01) |
| ***C08G 63/91*** | (2006.01) |

(52) U.S. Cl. ........ 524/504; 524/174; 524/175; 524/261; 524/300; 525/71

(58) Field of Classification Search .................. 524/174, 524/175, 300, 504, 261; 525/71
See application file for complete search history.

(56) References Cited

U.S. PATENT DOCUMENTS

| | | | |
|---|---|---|---|
| 4,767,833 | A | 8/1988 | Yumoto et al. |
| 5,210,132 | A | 5/1993 | Matsubara et al. |
| 5,466,722 | A | 11/1995 | Stoffer et al. |
| 5,973,079 | A | 10/1999 | Doyle |
| 6,448,342 | B2 | 9/2002 | Kurata et al. |
| 7,019,049 | B1 | 3/2006 | Yoo et al. |
| 2003/0013815 | A1 | 1/2003 | Wicher |
| 2006/0041062 | A1 | 2/2006 | Choi et al. |
| 2006/0142487 | A1 | 6/2006 | Hsu et al. |
| 2008/0248227 | A1 | 10/2008 | Sumimoto |
| 2009/0215960 | A1 * | 8/2009 | Jin et al. .......................... 525/94 |
| 2010/0222511 | A1 | 9/2010 | Sumimoto |

FOREIGN PATENT DOCUMENTS

| | | | |
|---|---|---|---|
| CN | 1320649 | A | 11/2001 |
| JP | 13-200134 | A | 7/2001 |
| JP | 2006-63127 | A | 3/2006 |
| KR | 10-2002-0003484 | A | 1/2002 |
| KR | 0429062 | A | 2/2003 |
| KR | 0519116 | A | 12/2003 |
| KR | 0507336 | A | 6/2004 |
| KR | 10-2005-30262 | A | 3/2005 |
| KR | 2006-016853 | A | 2/2006 |
| KR | 10-2006-0088269 | A | 8/2006 |
| WO | WO 0196469 | * | 12/2001 |
| WO | WO 0202691 | * | 1/2002 |
| WO | 2005/097905 | A1 | 10/2005 |

OTHER PUBLICATIONS

English Machine Translation of KR 10-2006-0088269.*

International Search Report and Written Opinion in counterpart International Application No. PCT/KR2006/005736, mailed on Jun. 8, 2007.

Chinese Office Action in counterpart Chinese Application No. 200680055750.2 dated May 11, 2010.

English translation of Chinese Office Action in counterpart Chinese Application No. 200680055750.2 dated May 11, 2010.

European Search Report in commonly owned European Application No. 06835399 dated Nov. 9, 2010, pp. 1-7.

International Search Report in commonly owned International Application No. PCT/KR2006/005695 dated Jul. 25, 2007, pp. 1-3.

Office Action in commonly owned U.S. Appl. No. 12/432,790 mailed Jun. 1, 2011, pp. 1-14.

* cited by examiner

*Primary Examiner* — Mark Eashoo
*Assistant Examiner* — Angela C Scott
(74) *Attorney, Agent, or Firm* — Summa, Additon & Ashe, P.A.

(57) ABSTRACT

One aspect of the invention relates to a transparent ABS resin composition having excellent impact resistance and flowability, which comprises about 10 to about 50 parts by weight of a rubber/(meth)acrylate-aromatic vinyl-unsaturated nitrile graft copolymer; about 50 to about 90 parts by weight of a thermoplastic resin matrix; and about 0.2 to about 0.5 parts by weight of a fluidizer, per 100 parts by weight of a base resin comprising the rubber/(meth)acrylate-aromatic vinyl-unsaturated nitrile graft copolymer and the thermoplastic resin matrix.

8 Claims, No Drawings

TRANSPARENT ABS RESIN COMPOSITION HAVING EXCELLENT IMPACT STRENGTH AND FLOWABILITY

CROSS-REFERENCE TO RELATED APPLICATIONS

This non-provisional application is a continuation-in-part application of PCT Application No. PCT/KR2006/005736, filed Dec. 27, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0087885, filed Sep. 12, 2006, and Korean Patent Application No. 10-2006-0134428, filed Dec. 27, 2006, the entire disclosure of each of which is also hereby incorporated by reference.

FIELD OF THE INVENTION

The present invention relates to a transparent ABS resin composition having excellent impact strength and flowability.

BACKGROUND OF THE INVENTION

Acrylonitrile-butadiene-styrene copolymer resin (hereinafter ABS resin) generally has a good balance of physical properties such as processability of styrene, toughness and chemical resistance of acrylonitrile, and impact resistance of butadiene, and has an excellent appearance. Therefore, ABS resins have been widely used in automobile parts, electronic and electrical appliances, office appliances, electronic goods, toys, stationery goods and the like. However, ABS resins are typically opaque. Accordingly, other transparent resins such as SAN (Styrene-Acrylonitrile), PC (Polycarbonate), PS (Polystyrene), PMMA (Polymethyl methacrylate) and the like, have been primarily employed as materials for applications requiring transparency.

However, although SAN, PS and PMMA resins are superior in transparency and cost, they have poor impact resistance, which restricts their application range. For example, polycarbonate resin has low chemical resistance and high cost, thereby limiting applications for its use, although transparency and impact resistance are superior. Therefore, efforts have been made to provide a transparent ABS resin satisfying both transparency and impact resistance requirements.

Korea Patent Nos. 0429062, 0507336, and 0519116, Korea Patent Laid-open No. 2006-016853, U.S. Pat. No. 4,767,833, U.S. Patent Publication No. 2006/0041062, and Japanese Patent Laid-open No. 2006-63127 disclose that transparency can be obtained by adjusting the difference in refractive index between the dispersed phase and the continuous phase (matrix resin) to not more than 0.005 and that impact strength of the transparent ABS resin can be improved by using rubber particles or rubber-graft copolymer prepared using various methods.

It is known to make ABS resin transparent by minimizing the diffusion of the light in the visible wavelength region by adjusting the size of the rubber particles employed in ABS resin. Another known method is matching the refractive indices between the dispersed phase (rubber) and the continuous phase (matrix resin) to minimize the diffusion and refraction of the light at the interface between the dispersed phase and the continuous phase. The ABS resins prepared by using these methods may have a practical usable transparency.

However, in addition to transparency, impact strength and fluidity are also important factors in the process of preparing the transparent ABS resins. Transparent ABS resins should have good impact strength and fluidity properties for extrusion or injection processes used to mold a desired shape and for the general uses of the resultant product.

The foregoing technologies disclose that the impact strength of the transparent ABS resins can be improved by using rubber particles prepared in various methods; they do not, however, teach a method of improving impact strength of the transparent ABS resin which solves the problems during melt-mixing of the ABS resin with a matrix resin. Also, according to the foregoing technologies, methacrylic acid alkyl ester or acrylic acid alkyl ester, aromatic vinyl compound and unsaturated nitrile compound can be mixed and copolymerized to adjust refraction index. However, resins containing methacrylic acid alkyl ester or acrylic acid alkyl ester generally have a stiff polymer chain, which decreases the compatibility of the resin with the rubber phase.

SUMMARY OF THE INVENTION

Accordingly, the present inventors have developed a transparent ABS resin composition prepared by melt extrusion of a mixture comprising a rubber/(meth)acrylate-aromatic vinyl-unsaturated nitrile graft copolymer, a thermoplastic resin used as a matrix resin, and a fluidizer to increase the compatibility between the rubber phase and the matrix phase and thereby improve impact strength as well as flowability. The present invention thus provides a transparent ABS resin composition having excellent impact strength and flowability.

One aspect of the invention provides a transparent ABS resin composition having excellent impact resistance and flowability, which comprises about 10 to about 50 parts by weight of a rubber/(meth)acrylate-aromatic vinyl-unsaturated nitrile graft copolymer; about 50 to about 90 parts by weight of a thermoplastic resin matrix; and about 0.2 to about 0.5 parts by weight of a fluidizer, per 100 parts by weight of a base resin comprising the rubber/(meth)acrylate-aromatic vinyl-unsaturated nitrile graft copolymer and the thermoplastic resin matrix.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Rubber/(Meth)Acrylate-Aromatic Vinyl-Unsaturated Nitrile Graft Copolymer

The rubber/(meth)acrylate-aromatic vinyl-unsaturated nitrile graft copolymer of the present invention may be prepared by graft-copolymerizing a mixture comprising a (meth) acrylic acid alkyl ester, an aromatic vinyl compound and a unsaturated nitrile compound onto a rubber selected from a conjugated diene-based rubber, a styrene-butadiene (SBR) rubber or a combination thereof.

The rubber/(meth)acrylate-aromatic vinyl-unsaturated nitrile graft copolymer can be polymerized by using emulsion polymerization, suspension polymerization, ionic polymerization, and the like.

Examples of the (meth)acrylic acid alkyl ester useful in the present invention may include without limitation methyl (meth)acrylate, ethyl(meth)acrylate, n-propyl(meth)acrylate, n-butyl-(meth)acrylate, t-butyl(meth)acrylate, cyclohexyl (meth)acrylate, n-hexyl(meth)acrylate, cycloethyl(meth) acrylate, glycidyl(meth)acrylate, and the like. These (meth) acrylic acid alkyl esters can be used alone or in combination with one another.

Examples of the aromatic vinyl compound useful in the present invention may include without limitation styrene, α-methyl styrene, p-methyl styrene, vinyl toluene, t-butyl styrene, chloro styrene, and the like. These aromatic vinyl compounds can be used alone or in combination with one another.

Examples of the unsaturated nitrile compound useful in the present invention can include without limitation acrylonitrile, methacrylonitrile, ethacrylonitrile, and the like. These unsaturated nitrile compounds can be used alone or in combination with one another.

The rubber/(meth)acrylate-aromatic vinyl-unsaturated nitrile graft copolymer can be prepared by known methods which can be easily carried out by a person of ordinary skill in the art.

In exemplary embodiments of the invention, the rubber/(meth)acrylate-aromatic vinyl-unsaturated nitrile graft copolymer can be used as a mixture of at least two of the graft copolymers.

(B) Thermoplastic Resin

The thermoplastic resin used as a matrix resin of the present invention may be prepared by polymerizing a monomer mixture comprising (meth)acrylic acid alkyl ester, aromatic vinyl compound, unsaturated nitrile compound, and the like to minimize the difference between the refractive index of the matrix resin and the refractive index of the rubber/(meth)acrylate-aromatic vinyl-unsaturated nitrile graft copolymer.

The thermoplastic resin may be polymerized by using emulsion polymerization, suspension polymerization, solution polymerization, continuous bulk polymerization, and the like, which can be easily carried out by a person of ordinary skill in the art.

The difference between the refractive index of the rubber/(meth)acrylate-aromatic vinyl-unsaturated nitrile graft copolymer and the thermoplastic matrix resin is about 0.005 or less, for example about 0 to about 0.003.

Examples of the (meth)acrylic acid alkyl ester useful in the present invention may include without limitation methyl (meth)acrylate, ethyl(meth)acrylate, n-propyl(meth)acrylate, n-butyl-(meth)acrylate, t-butyl(meth)acrylate, cyclohexyl (meth)acrylate, n-hexyl(meth)acrylate, cycloethyl(meth) acrylate, glycidyl(meth)acrylate, and the like. These (meth) acrylic acid alkyl esters can be used alone or in combination with one another.

Examples of the aromatic vinyl compound useful in the present invention may include without limitation styrene, α-methyl styrene, p-methyl styrene, vinyl toluene, t-butyl styrene, chloro styrene, and the like. These aromatic vinyl compounds can be used alone or in combination with one another.

Examples of the unsaturated nitrile compound useful in the present invention may include without limitation acrylonitrile, methacrylonitrile, ethacrylonitrile, and the like. These unsaturated nitrile compounds can be used alone or in combination with one another.

(C) Fluidizer

Stearate derivatives, stearamide derivatives, polysiloxane derivatives, and the like and combinations thereof may be used as the fluidizer of the present invention.

Examples of the fluidizer useful in the present invention may include without limitation stearate derivatives such as barium stearate, calcium stearate, magnesium stearate, zinc stearate, and the like; stearamide derivatives such as ethylene bis stearamide, propylene bis stearamide, and the like; and polysiloxane derivatives such as dimethyl polysiloxane, diethyl polysiloxane, acrylate dimethylpolysiloxane, and the like.

The amount of the fluidizer is about 0.2 to about 0.5 parts by weight, per 100 parts by weight of a base resin comprising the rubber/(meth)acrylate-aromatic vinyl-unsaturated nitrile graft copolymer and the thermoplastic resin matrix. If the amount is less than about 0.2 parts by weight, the impact strength and the flowability of the transparent ABS resin obtained therefrom may be decreased. If the amount is more than about 0.5 parts by weight, the impact strength of the transparent ABS resin obtained therefrom may be deteriorated.

The transparent ABS resin composition of the present invention may further comprise other additives such as heat stabilizers, light stabilizers, whitening or brightening agents, dyes, pigments, antistatic agents, plasticizers, flame retardants, and the like. The additives can be used singly or in combination as a mixture. These additives may be included in desired amounts, which will be apparent to those skilled in the art.

The transparent ABS resin of the present invention can be prepared by a conventional method. For example, the components may be mixed together by using a conventional kneader or a mixer and extruded through an extruder and further can be prepared in the form of pellets.

In exemplary embodiments of the invention, the rubber/(meth)acrylate-aromatic vinyl-unsaturated nitrile graft copolymer, the thermoplastic matrix resin and the fluidizer are mixed together and extruded at a cylinder temperature of about 200 to about 280° C. with an extrusion compounder in pellets.

The present invention may be better understood by reference to the following examples that are intended for the purpose of illustration and are not to be construed as in any way limiting the scope of the present invention, which is defined in the claims appended hereto.

EXAMPLES

Example 1

35 parts by weight of polybutadiene rubber/methyl methacrylate-styrene-acrylonitrile graft copolymer prepared by emulsion polymerization, 65 parts by weight of methyl methacrylate-styrene-acrylonitrile copolymer and 0.2 parts by weight of ethylene bis stearamide are mixed together and extruded at a cylinder temperature of 220° C. with a twin screw extruder to prepare a transparent ABS resin in pellets. The pellets are molded into test specimens for measuring physical properties. The results are shown in Table 1. The refractive indices of the polybutadiene rubber/methyl methacrylate-styrene-acrylonitrile graft copolymer and the methyl methacrylate-styrene-acrylonitrile copolymer as measured by using a prism coupler manufactured by Metricon Corp. are the same, 1.513.

Example 2

Example 2 is prepared in the same manner as in Example 1 except that 0.3 parts by weight of ethylene bis stearamide is used. The transparent ABS resin is molded into test specimens for measuring physical properties. The results are shown in Table 1.

Example 3

Example 3 is prepared in the same manner as in Example 1 except that 0.5 parts by weight of ethylene bis stearamide is used. The transparent ABS resin is molded into test specimens for measuring physical properties. The results are shown in Table 1.

Comparative Example 1

Comparative Example 1 is prepared in the same manner as in Example 1 except that 0.1 part by weight of ethylene bis stearamide is used. The transparent ABS resin is molded into test specimens for measuring physical properties. The results are shown in Table 1.

Comparative Example 2

Comparative Example 2 is prepared in the same manner as in Example 1 except that 0.6 parts by weight of ethylene bis stearamide is used. The transparent ABS resin is molded into test specimens for measuring physical properties. The results are shown in Table 1.

Example 4

35 parts by weight of SBR rubber/methyl methacrylate-styrene-acrylonitrile graft copolymer prepared by emulsion polymerization, 65 parts by weight of methyl methacrylate-styrene-acrylonitrile copolymer and 0.3 parts by weight of ethylene bis stearamide are mixed together and extruded at cylinder temperature of 220° C. with a twin screw extruder to prepare a transparent ABS resin in pellets. The pellets are molded into test specimens for measuring physical properties. The results are shown in Table 2. The refractive indices of the SBR rubber/methyl methacrylate-styrene-acrylonitrile graft copolymer and the methyl methacrylate-styrene-acrylonitrile copolymer as measured by using a prism coupler manufactured by Metricon Corp. are the same, 1.533.

Comparative Example 3

Comparative Example 3 is prepared in the same manner as in Example 4 except that 0.1 part by weight of ethylene bis stearamide is used. The transparent ABS resin is molded into test specimens for measuring physical properties. The results are shown in Table 2.

Comparative Example 4

Comparative Example 4 is prepared in the same manner as in Example 4 except that 0.6 parts by weight of ethylene bis stearamide is used. The transparent ABS resin is molded into test specimens for measuring physical properties. The results are shown in Table 2.

The physical properties of the test specimens are measured in accordance with the following methods.

(1) Izod Impact Strength (kg·cm/cm): The Izod impact strength is measured in accordance with ASTM D256 using ⅛" thick specimens.

(2) Haze (%): The haze is measured by a Haze meter produced by Nippon Denshoku Co., using a 3 mm thick test sample.

(3) Flowability ((g/10 min, 220° C.)/10 kg): The flowability is measured in accordance with ASTM D-1238.

TABLE 1

| | | Content of fluidizer | Haze | Impact strength | Flowability |
|---|---|---|---|---|---|
| Examples | 1 | 0.2 parts | 2.0 | 16.6 | 20 |
| | 2 | 0.3 parts | 2.0 | 16.5 | 20 |
| | 3 | 0.5 parts | 2.0 | 16.2 | 20 |
| Comparative | 1 | 0.1 part | 2.0 | 10.6 | 16 |
| Example | 2 | 0.6 parts | 2.0 | 14.5 | 20 |

TABLE 2

| | | Content of fluidizer | Haze | Impact strength | Flowability |
|---|---|---|---|---|---|
| Example 4 | | 0.3 parts | 2.1 | 14.5 | 25 |
| Comparative | 3 | 0.1 part | 2.1 | 8.7 | 18 |
| examples | 4 | 0.6 parts | 2.1 | 12.8 | 25 |

As shown in Tables 1 and 2, the transparent ABS resins having the same refractive indices between the rubber phase and the matrix resin show good impact strength and flowability when the proper amount of the fluidizer is added. However, if the amount of the fluidizer is lower than the proper range, the transparent ABS resins obtained therefrom cannot have sufficient impact strength and fluidity. If the amount of the fluidizer exceeds the proper range, the impact strength of the transparent ABS resins is degraded.

The above Examples and Comparative Examples provide evidence that the transparent ABS resin according to the present invention may have good impact strength and flowability.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A transparent ABS resin composition having excellent impact resistance and flowability, which comprises:

about 10 to about 50 parts by weight of a rubber/(meth)acrylate-aromatic vinyl-unsaturated nitrile graft copolymer;

about 50 to about 90 parts by weight of a thermoplastic resin matrix; and about 0.2 to about 0.5 parts by weight of a fluidizer, per 100 parts by weight of a base resin comprising the rubber/(meth)acrylate-aromatic vinyl-unsaturated nitrile graft copolymer and the thermoplastic resin matrix, wherein said fluidizer is selected from stearate derivatives, stearamide derivatives, dimethyl polysiloxane, diethyl polysiloxane, acrylate dimethyl polysiloxane, or a combination thereof.

2. The transparent ABS resin composition of claim 1, wherein said rubber/(meth)acrylate-aromatic vinyl-unsaturated nitrile graft copolymer is prepared by graft-copolymerizing a mixture comprising a (meth)acrylic acid alkyl ester, an aromatic vinyl compound and an unsaturated nitrile compound onto a rubber selected from a conjugated diene-based rubber, a styrene-butadiene (SBR) rubber or a combination thereof.

3. The transparent ABS resin composition of claim 1, wherein said rubber/(meth)acrylate-aromatic vinyl-unsaturated nitrile graft copolymer is a rubber/methyl methacrylate-styrene-acrylonitrile graft copolymer.

4. The transparent ABS resin composition of claim 1, wherein the difference of refractive index between the rubber/(meth)acrylate-aromatic vinyl-unsaturated nitrile graft copolymer and the thermoplastic resin matrix is about 0.005 or less.

5. The transparent ABS resin composition of claim 1, wherein said thermoplastic resin matrix is a copolymer of a (meth)acrylic acid alkyl ester, an aromatic vinyl compound, and an unsaturated nitrile compound.

6. The transparent ABS resin composition of claim 1, wherein said stearate derivative is selected from barium stearate, calcium stearate, magnesium stearate, zinc stearate, or a combination thereof, and wherein said stearamide derivative is selected from ethylene bis stearamide, propylene bis stearamide, or a combination thereof.

7. The transparent ABS resin composition of claim 1, further comprising additives selected from heat stabilizers, light stabilizers, whitening or brightening agents, dyes, pigments, antistatic agents, plasticizers, flame retardants, or combinations thereof.

8. A molded article prepared with the transparent ABS resin composition as defined by claim 1.

* * * * *